(12) United States Patent
Jeong et al.

(10) Patent No.: US 11,536,626 B2
(45) Date of Patent: Dec. 27, 2022

(54) METHOD OF EVALUATING INTEGRATED RUNNING ENERGY OF VEHICLE IN WIND TUNNEL

(71) Applicants: Hyundai Motor Company, Seoul (KR); Kia Corporation, Seoul (KR)

(72) Inventors: Ji Min Jeong, Seoul (KR); Jin Hyuck Chang, Gunpo-Si (KR); Min Sik Chung, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 96 days.

(21) Appl. No.: 17/306,405

(22) Filed: May 3, 2021

(65) Prior Publication Data
US 2022/0082470 A1    Mar. 17, 2022

(30) Foreign Application Priority Data
Sep. 16, 2020    (KR) ........................ 10-2020-0118865

(51) Int. Cl.
*G01M 9/06* (2006.01)
*G01M 17/007* (2006.01)
*G01M 9/04* (2006.01)

(52) U.S. Cl.
CPC ................ *G01M 9/06* (2013.01); *G01M 9/04* (2013.01); *G01M 17/0072* (2013.01)

(58) Field of Classification Search
CPC ...... G01M 9/06; G01M 9/04; G01M 17/0072; G01M 17/0074; G01M 9/062; G01M 17/007; G01M 9/02; G01L 5/13; G01P 3/02
See application file for complete search history.

(56) References Cited

U.S. PATENT DOCUMENTS

| | | | |
|---|---|---|---|
| 8,483,949 B2 * | 7/2013 | Taguchi | B60W 50/085 701/25 |
| 10,189,453 B2 * | 1/2019 | Payne | B60T 8/172 |
| 10,657,734 B2 * | 5/2020 | Adachi | G01N 33/0004 |
| 11,073,444 B2 * | 7/2021 | Hoehr | F02B 77/084 |
| 2005/0171678 A1 * | 8/2005 | Takahashi | F02D 11/105 701/104 |
| 2005/0173179 A1 * | 8/2005 | Amanuma | B60W 10/26 180/247 |
| 2019/0113416 A1 * | 4/2019 | Harmon | G01M 17/007 |

FOREIGN PATENT DOCUMENTS

KR    101563352 B1    10/2015

* cited by examiner

*Primary Examiner* — Freddie Kirkland, III
(74) *Attorney, Agent, or Firm* — Morgan, Lewis & Bockius LLP

(57) ABSTRACT

A method of evaluating integrated running energy of a vehicle in a wind tunnel may include estimating change in fuel efficiency according to change of vehicle parts thereby facilitating precise measurement of running energy.

20 Claims, 4 Drawing Sheets

METHOD OF EVALUATING INTEGRATED RUNNING ENERGY OF VEHICLE IN WIND TUNNEL

CROSS-REFERENCE TO RELATED APPLICATION

The present application claims priority to Korean Patent Application No. 10-2020-0118865, filed Sep. 16, 2020, the entire contents of which is incorporated herein for all purposes by this reference.

BACKGROUND OF THE INVENTION

Field of the Invention

The present invention relates to a method of evaluating integrated running energy of a vehicle in a wind tunnel, facilitating precise measurement of running energy. More particularly, it relates to a method of evaluating integrated running energy of a vehicle in a wind tunnel, more precisely estimating change in fuel efficiency according to change of vehicle parts.

Description of Related Art

In a certification procedure of fuel efficiency of a vehicle, actual road coastdown is implemented. As shown in FIG. 1, a test vehicle driven at a high speed on a straight road without a gradient is put in neutral in coastdown testing. The coastdown test is designed to measure change in vehicle speed at a certain time interval or time taken to decelerate in a certain speed section. Data obtained in the coastdown test is analyzed to determine traveling resistance acting on the test vehicle.

There are several issues to be addressed in the existing coastdown test. First, errors are high due to a number of disturbance factors, such as temperature, wind speed, humidity, road conditions and the driver, which increases testing time as round trip tests must be repeated to ensure normality of the data. In the coastdown test, an external wind speed and a vehicle speed are measured, and an anemometer and a speedometer need to be mounted on the test vehicle, which may distort air resistance. Above all, contributions to acceleration resistance and deceleration resistance cannot be measured.

Therefore, there is a demand for a method of evaluating running resistance of a vehicle in a novel way.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an improved method of evaluating running energy, providing enhanced precision and accuracy of data.

According to various exemplary embodiments of the present invention, a method of evaluating integrated running energy of a vehicle in a wind tunnel includes: placing a vehicle in a wind tunnel; changing vehicle speeds by rotating wheels of the vehicle to obtain a plurality of constant speed sections and a plurality of speed change sections, wherein the vehicle speeds are held constant in each constant speed section, the plurality of constant speed sections have different constant speeds with each other, and the vehicle speeds are increased or decreased between adjoining constant speed sections in the speed change sections; measuring and collecting exerted forces in each of the constant speed sections and exerted forces in each of the speed change sections; separating the exerted forces in each of the constant speed sections from the exerted forces in each of the speed change sections; determining running energy of the constant speed sections based on the separated exerted forces in each of the constant speed sections and determining running energy of the speed change sections based on the separated exerted forces in each of the speed change sections; and acquiring the integrated running energy of the vehicle on the basis of the running energy of the constant speed sections and the running energy of the speed change sections.

According to various exemplary embodiments of the present invention, a method of evaluating integrated running energy of a vehicle in a wind tunnel, wherein a test vehicle is positioned in the wind tunnel provided with a wheel rotating device and wheels of the test vehicle are rotated by the wheel rotating device, includes: a warm-up step of performing a warm-up of the test vehicle; a deceleration evaluation step of evaluating deceleration of the test vehicle after the warm-up step; a section separation step of separating data obtained from the deceleration evaluation step into constant speed sections and a speed change section; a running energy determination step of determining running energy of the constant speed sections and running energy of the speed change section; and an integrated running energy determination step of acquiring the integrated running energy of the vehicle on the basis of the determined running energy of the constant speed sections and the determined running energy of the speed change section.

Other aspects and exemplary embodiments of the present invention are discussed infra.

The above and other features of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuels derived from resources other than petroleum. As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
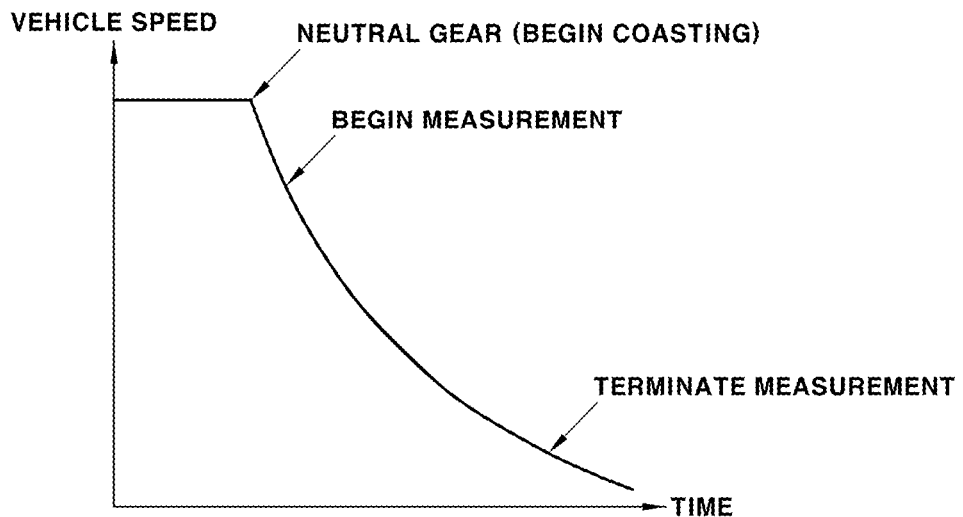
FIG. 1 is a graph for describing the existing coastdown test.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the accompanying drawings. Specific structures or functions described in the exemplary embodiments of the present invention are merely for illustrative purposes. Embodiments according to the concept of the present invention may be implemented in various forms, and it should be understood that they should not be construed as being limited to the exemplary embodiments described in the present specification, but include all of modifications, equivalents, or substitutes included in the spirit and scope of the present invention.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for describing various exemplary embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in the present specification, specify the presence of stated components, steps, operations, and/or elements, but do not preclude the presence or addition of one or more other components, steps, operations, and/or elements thereof.

Hereinafter, the present invention will be described in detail with reference to the accompanying drawings.

Figure 2:
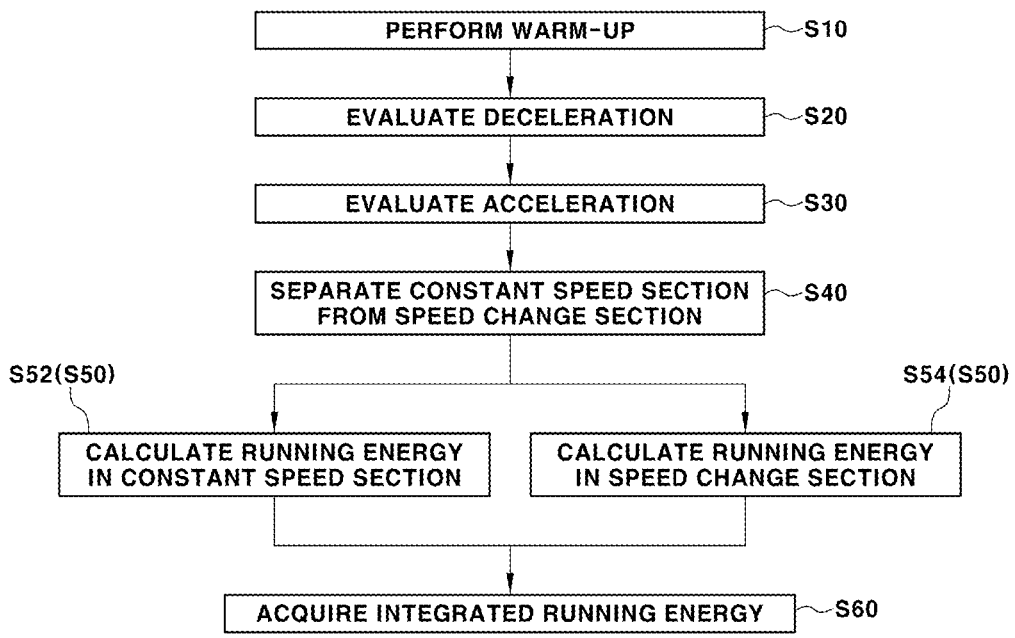
FIG. 2 is a flowchart illustrating a method of evaluating integrated running energy of a vehicle in a wind tunnel according to various exemplary embodiments of the present invention.

As shown in FIG. 2, a method of evaluating integrated running energy of a vehicle in a wind tunnel according to various exemplary embodiments of the present invention includes performing a step S10 of warm-up, a step S20 of evaluating deceleration, a step S30 of evaluating acceleration, a step S40 of separating sections S40, a step S50 of determining running energy, and a step S60 of acquiring integrated running energy.

Figure 3:
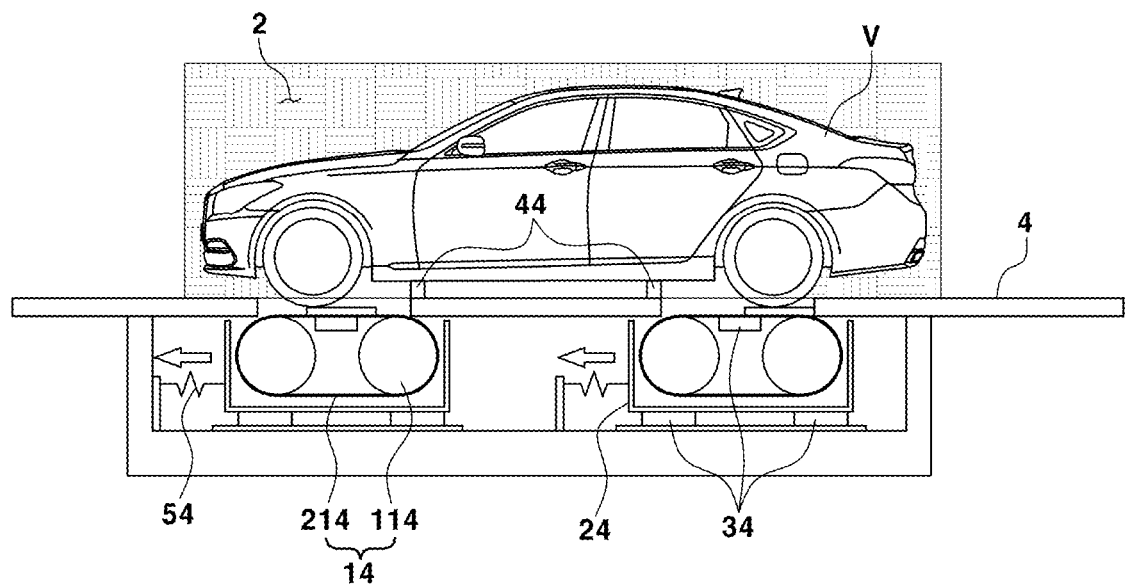
FIG. 3 is a schematic diagram illustrating a ground stimulation device in a wind tunnel in which the method of evaluating integrated running energy of a vehicle in a wind tunnel according to various exemplary embodiments of the present invention is performed.

Referring to FIG. 3, the evaluating method according to various exemplary embodiments of the present invention may be implemented in a wind tunnel 2. A fan or the like configured to adjust air speed is provided in the wind tunnel 2. Since the evaluating method of the present invention may be performed in the wind tunnel 2, the amount of time needed to take measurements can be drastically reduced and errors caused by disturbances can be minimized. Therefore, precision of the test result may be improved.

A ground stimulation device 4 is provided in the wind tunnel 2. The ground stimulation device 4 includes a wheel rotating device 14 which includes drums 114 and a belt 214. The drums 114 are configured to be rotatable by driving force applied from an external source, and the belt 214 is disposed on an outer circumference of the drums 114 and is configured to be rotatable together with the drums 114. Wheels of a test vehicle V are configured to be in contact with the belt 214 to be supported thereon.

The wheel rotating device 14 is accommodated in a measurement platform 24. The measurement platform 24 is configured to be supported from the ground by air bearings 34 to minimize influence of other friction factors. Furthermore, the test vehicle V is supported and connected by one or more vertical struts 44 formed in the ground stimulation device 4.

The wheel rotating device 14 is provided with a force measurement portion 54 measuring the force by which the drums 114 drive the belt 214. As a non-limiting example, the force measurement portion 54 may include a load cell.

Figure 4:
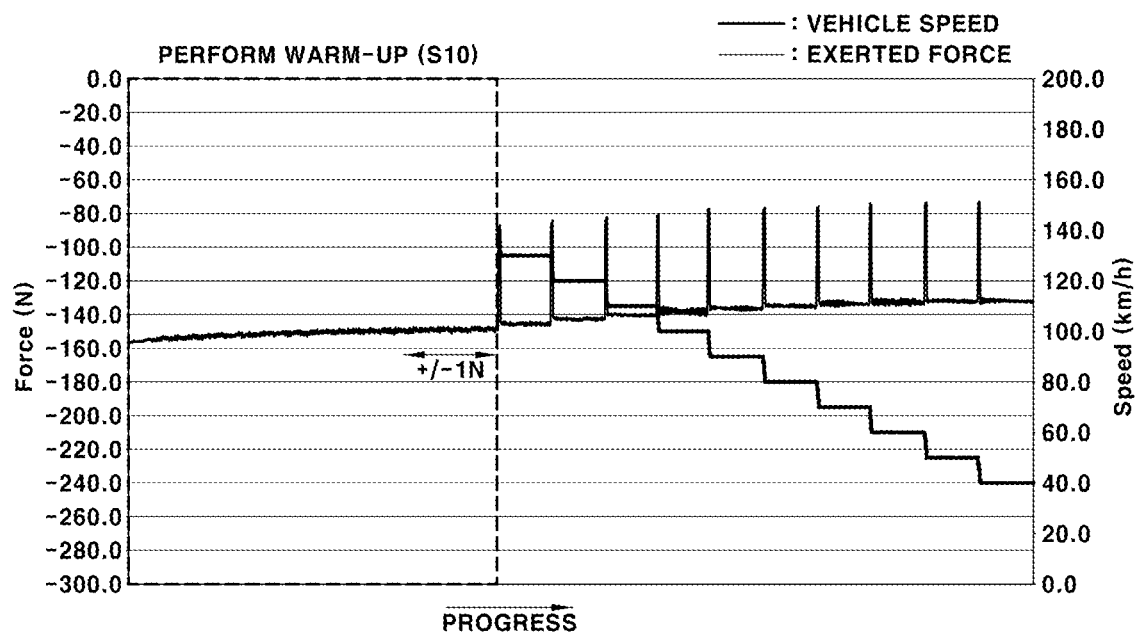
FIG. 4 is a graph showing measured data in a warm-up step of the method of evaluating integrated running energy of a vehicle in a wind tunnel according to various exemplary embodiments of the present invention.

As shown in FIG. 4, the step S10 of warm-up is conducted to minimize errors generated due to deformation of a tire prior to evaluation of the integrated running energy. According to various exemplary embodiments of the present invention, in the step S10 of warm-up, the wheels of the test vehicle V are rotated by the wheel rotating device 14 to increase temperature of the tire. According to various exemplary embodiments of the present invention, the wind speed in the wind tunnel 2 is set to 0 kilometers/hour (km/h) and the wheels are rotated at a rotation speed of 140 km/h or more in a fixed mode so that the temperature of the tire is rapidly increased. This can increase the temperature of the tire as rapidly as possible, i.e., decrease the amount of time taken to perform the step S10 of warm-up as much as possible.

Meanwhile, in the step S10 of warm-up, the force driving the wheels of the test vehicle V may be measured through the force driving the belt 214 of the wheel rotating device 14 and may be measured by the force measurement portion 54. Furthermore, according to various exemplary embodiments of the present invention, the force and speed data may be taken at a frequency of 10 Hertz (Hz) or higher to collect a sufficient amount of data. The step S10 is terminated when errors in force measurements obtained for a predetermined first time period are maintained within a certain range. According to various exemplary embodiments of the present invention, the predetermined first time period is two hundred seconds, and the error range in force is ±1 N. That is, when errors in exerted forces measured by the force measurement portion 54 for two hundred seconds are maintained within ±1 N, the step S10 of warm-up is terminated.

In the step S20 of evaluating deceleration and the step S30 of evaluating acceleration, forces exerted in each constant speed section and forces exerted in each speed change section are measured for certain speed sections. According to various exemplary embodiments of the present invention, the step S20 of evaluating deceleration is performed before the step S30 of evaluating acceleration. According to various exemplary embodiments of the present invention, the step S30 of evaluating acceleration is implemented before the step S20 of evaluating deceleration.

Figure 5:
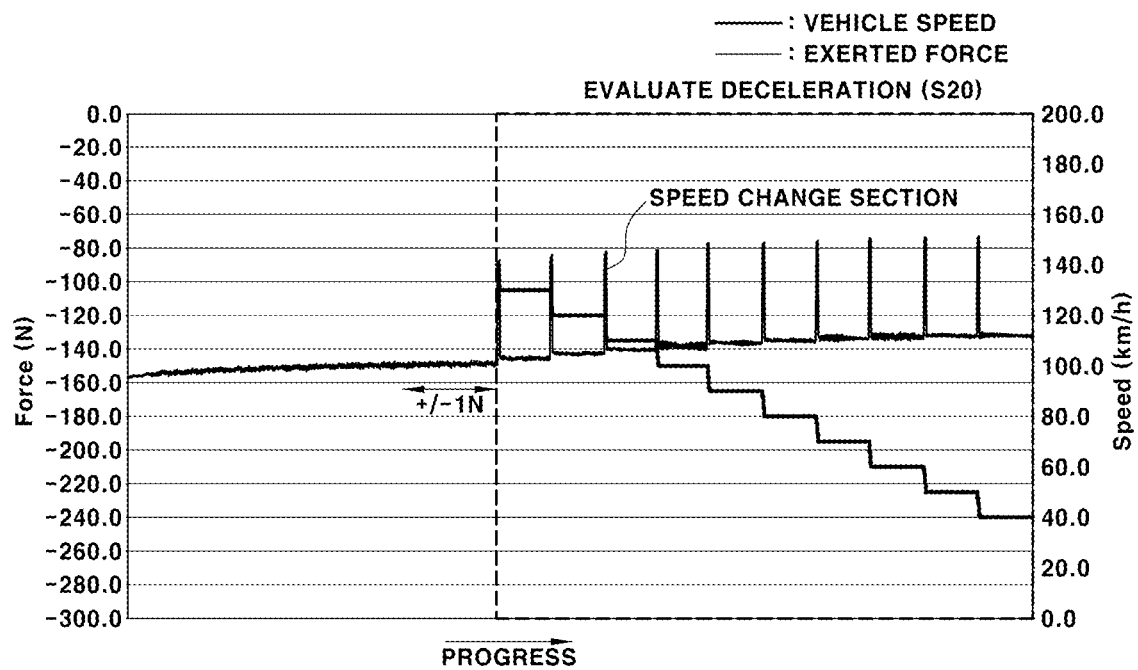
FIG. 5 is a graph showing measured data in a step of deceleration of the method of evaluating integrated running energy of a vehicle in a wind tunnel according to various exemplary embodiments of the present invention.

FIG. 5 depicts the measured data in the step S20 of evaluating deceleration. Except for increasing the speed for each speed section, the step S30 of evaluating acceleration is conducted in a similar manner as the step S20 of evaluating deceleration, so implementing the step S20 of evaluating deceleration will be representatively described herein.

Referring to FIG. 5, at steps S20 and S30, the speed of the wheels and the force exerted to rotate the wheels are measured at a preset speed interval. As a non-limiting example, the preset speed interval may be 10 km/h as in FIG. 5. As a non-limiting example, the preset speed interval may be 5 km/h or 20 km/h. The preset speed interval is not limited to these values provided as the non-limiting examples, and the preset speed interval may be changed, as necessary.

According to various exemplary embodiments of the present invention, data in each constant speed section, i.e., a section in which a constant speed is maintained, is measured for a preset time or longer. As a non-limiting example, the preset time may be ten seconds.

In the step S20 of evaluating deceleration, it is preferable to begin the measurement from a vehicle speed which is higher than a maximum speed in a fuel efficiency certification mode. For example, a reference vehicle speed of Worldwide harmonized Light duty driving Test Cycle (WLTC) is 140 km/h. The measurement started at the vehicle speed of 140 km in the present experiment provided in FIG. 5, but the vehicle speed is not limited to the speed value.

At steps S20 and S30, the forces in each constant speed section may be measured by the force measurement portion 54, that is, the force by which the drums 114 rotate the belt 214. Rolling resistance, wheel rotation resistance, acceleration resistance, and deceleration resistance may be derived from the measured force. Also, air resistance is measured by the vertical struts 44 and the measurement platform 24 of the ground stimulation device 4.

In the step S40 of separating sections, the forces measured in the step S20 of evaluating deceleration or the step S30 of deceleration are separated into the forces in the constant speed section and the forces in the speed change section. When the preset speed interval is 10 km/h, the speed change section is classified at an interval of 10 km/h. According to various exemplary embodiments of the present invention, a criterion for classifying the forces of the constant speed section from the forces of the speed change section is determined in consideration of a preset force difference value. For instance, when an exerted force of about 140 N is measured in a speed section of 120 km/h, values ranging from 135 N to 139 N are not included in the constant speed section of 120 km/h. These values are provided as illustrative.

In the step S50 of determining running energy, required running energy is determined based on the forces in the constant speed section and the forces in the speed change section, which are separated in the step S40 of separating sections. The step S50 of determining running energy includes a step S52 of determining running energy in the constant speed sections and a step S54 of determining running energy in the speed change sections.

At step S52 of determining running energy in the constant speed sections, running energy $E_c$ in each constant speed section is obtained by multiplying a force Fc in each constant speed section, an average of wheel speeds $v_{avg,c}$, and a required time $t_c$.

$$E_c = F_c \cdot v_{avg,c} \cdot t_c \qquad \text{[Equation 1]}$$

At step S54, in determining the running energy in the speed change sections, excluded is force data of the speed change section, which falls within a range of a certain value (as a non-limiting example, approximately 5 N) compared to the constant speed section. These excluded data values are basically included in the next constant speed section. However, even if the data values are within the range of 5 N, the data values are, instead, included as the force in the speed change section when the speed at that force fails to reach the speed in the next adjoining speed section. Referring to the above example, in case of a speed change section in which deceleration is conducted from a 120 km/h constant speed section (a measured force: about 140 N) to a 110 km/h constant speed section (a measured force: about 138 N), data values in a range of 135 N to 140 N, which is the 5 N range of 140 N, are excluded when running energy in the speed change section is determined. However, even though a force measurement is within the above range of 135 N to 140 N, the present force measurement is included in the determination as a force in the speed change section between 120 km/h and 110 km/h if the speed at the present force measurement fails to reach a speed of a next constant speed section (i.e., a 110 km/h speed section). The present example is also provided as illustrative to aid understanding.

The running energy, $E_v$, in the speed change section is acquired by multiplying a force $F_v$ of each speed change section obtained as above by an average of wheel speeds for each time $V_{avg,v}$ and a time $t_v$ as provided in Equation 2 below.

$$E_v = F_v \cdot v_{avg,v} \cdot t_v \quad \text{[Equation 2]}$$

Meanwhile, when an unmeasured section is present in conversion of the running energies in the constant speed sections and the speed change sections, running energy in the unmeasured section is determined through a regression equation between the speed and the exerted force.

In the step S60 of acquiring the integrated running energy, integrated running energy is determined on the basis of the determined running energy in the constant speed sections and the running energy in the speed change sections. The integrated running energy is determined by adding running energy used during deceleration or acceleration to the running energy in the constant speed section, and deceleration energy or acceleration energy is added by determining the energy used at a section interval of 10 km/h. Exemplary deceleration energy values for each speed section are presented in Table 1.

TABLE 1

| Deceleration (km/h) | Deceleration (kJ) |
| --- | --- |
| 140-130 | 4033.689279 |
| 130-120 | 3641.561471 |
| 120-110 | 3452.122697 |
| 110-100 | 3315.34828 |
| 100-90 | 2965.400244 |
| 90-80 | 2665.452996 |
| 80-70 | 2431.432832 |
| 70-60 | 2182.759063 |
| 60-50 | 1740.349209 |
| 50-40 | 1411.100962 |
| 40-30 | 1243.57 |
| 30-20 | 963.51 |
| 20-10 | 683.45 |
| 0-10 | 403.39 |

Figure 6A:
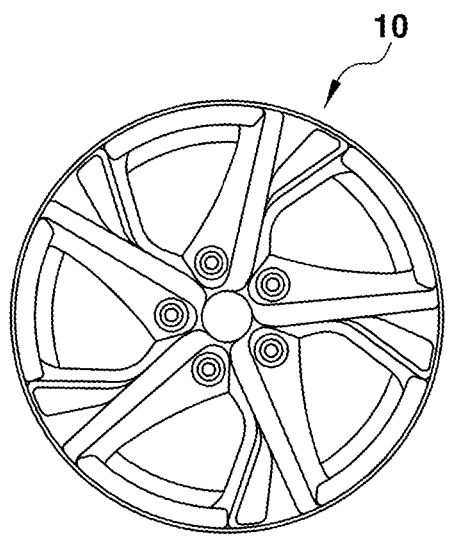
FIG. 6A and FIG. 6B are diagrams illustrating a base wheel with existing features and an aerodynamic wheel with improved features, which are evaluated in accordance with the method of evaluating integrated running energy of a vehicle in a wind tunnel according to various exemplary embodiments of the present invention.
Figure 6B:
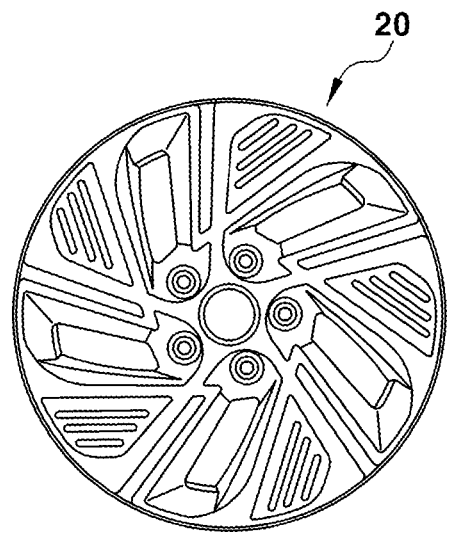

As shown in FIG. 6A and FIG. 6B, fuel efficiency after aerodynamic wheels 20 are applied was evaluated according to various exemplary embodiments of the present invention by comparing the base wheels 10 with the existing features and the aerodynamic wheels 20 with improved features.

Figure 7:
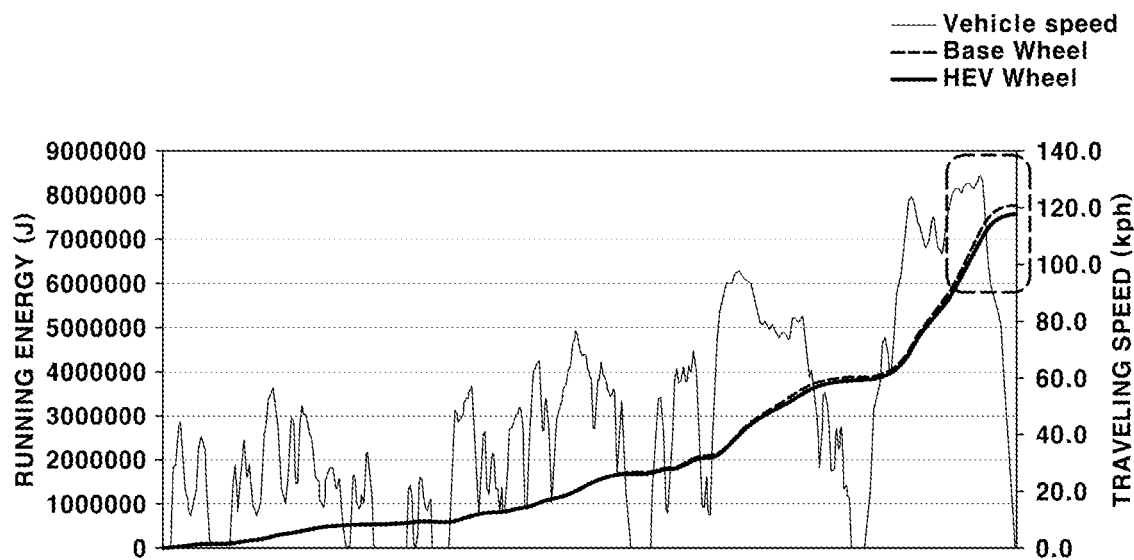
FIG. 7 is a graph showing measured data of the base wheel with the existing features and the aerodynamic wheel with the improved features, which are evaluated according to the method of evaluating integrated running energy of a vehicle in a wind tunnel according to various exemplary embodiments of the present invention.

Table 2 shows measured items and their corresponding values with respect to the base wheels 10 and the aerodynamic wheels 20, and FIG. 7 shows a running energy graph according to application of the base wheels 10 and the aerodynamic wheels 20. In FIG. 7, "Base Wheel" indicates running energy of the base wheels 10, and "HEV Wheel" indicates running energy of the aerodynamic wheels 20.

TABLE 2

| Items | Base Wheel 10 | Aerodynamic Wheel 20 | Remarks |
| --- | --- | --- | --- |
| Wheel mass (kg) | 8.58 each * 4 | 9.57 each * 4 | Tire of Goodyear ® |
| Aerodynamic Performance | 0.252 | 0.246 | — |
| Mass Moment of Inertia (MMOI) (kg · m²) | 0.244 | 0.265 | Measurement Results of CATIA ® (Aluminum) |
| Integrated Running Energy (J) | 7,770,710 | 7,562,147 | — |

TABLE 2-continued

| Items | Base Wheel 10 | Aerodynamic Wheel 20 | Remarks |
| --- | --- | --- | --- |
| Running Energy (J) | 7,410,722 | 7,210,779 | — |
| Acceleration/Deceleration Energy (J) | 359,988 | 351,368 | — |

As can be seen from Table 2 above, the aerodynamic performance of the aerodynamic wheel 20 was improved to have a positive effect on the fuel efficiency, but, in terms of weight and inertia, the aerodynamic wheel 20 had a negative effect on the fuel efficiency. That is, according to the existing evaluation method, when the aerodynamic wheel 20 was applied, it was unclear whether overall fuel efficiency was improved, and it was difficult to collect quantitative data due to deformation of the tire according to the speed.

On the other hand, according to various exemplary embodiments of the present invention, it was noted that the running energy was reduced by approximately 208 kJ. That is, through the evaluating method according to various exemplary embodiments of the present invention, quantitative data can be obtained and improvement in integrated fuel efficiency can be determined despite fuel efficiency conflicting factors.

According to the method of evaluating integrated running energy of a vehicle in a wind tunnel of the present invention, when the integrated running energy is measured, since disturbance factors are reduced as compared with the existing evaluation method, there is an advantage in significantly increasing accuracy of the running energy measurement and reducing a measurement time.

Furthermore, according to various exemplary embodiments of the present invention, since an anemometer or speedometer is not mounted on the test vehicle, distortion by air resistance can be avoided and acceleration/deceleration resistance can be measured. Consequently, it is possible to quantitatively measure whether final fuel efficiency is improved with respect to all kinds of conflicting fuel efficiency improvement plans.

According to various exemplary embodiments of the present invention, it is possible to accurately measure exerted energy and the amount of improvement in the fuel efficiency with respect to a rotation portion and a wheel/tire portion where deformation occurs according to a speed, which has been difficult to measure so far. In addition, according to various exemplary embodiments of the present invention, it is possible to quantitatively measure a final fuel efficiency improvement effect with respect to all fuel efficiency improvement plans according to changes in various parts of the vehicle.

In accordance with various aspects of the present invention, there is provided a method of evaluating integrated running energy of a vehicle in a wind tunnel, which can minimize an influence of disturbance factors through measurement in the wind tunnel as compared with the existing method.

In accordance with various aspects of the present invention, there is provided the method of evaluating integrated running energy of a vehicle in a wind tunnel, which can improve data precision and reduce a measurement time through the measurement in the wind tunnel.

In accordance with various aspects of the present invention, there is provided the method of evaluating integrated running energy of a vehicle in a wind tunnel, which can measure acceleration resistance and deceleration resistance.

In accordance with various aspects of the present invention, the method of evaluating integrated running energy of a vehicle in a wind tunnel can accurately measure exerted energy and an improvement amount of the fuel efficiency due to changes of parts of a vehicle.

In various exemplary embodiments of the present invention, a controller may perform the method of evaluating integrated running energy of a vehicle in a wind tunnel.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of evaluating integrated running energy of a vehicle in a wind tunnel, the method comprising:
   placing the vehicle in the wind tunnel;
   changing vehicle speeds by rotating wheels of the vehicle to obtain a plurality of constant speed sections and a plurality of speed change sections, wherein the vehicle speeds are held constant in each constant speed section, the plurality of constant speed sections have different constant speeds with each other, and the vehicle speeds are increased or decreased between adjoining constant speed sections in the plurality of speed change sections;
   measuring and collecting exerted forces for rotating the wheels in each of the plurality of constant speed sections and exerted forces for rotating the wheels in each of the plurality of speed change sections;
   separating the exerted forces in each of the plurality of constant speed sections from the exerted forces in each of the plurality of speed change sections;
   determining running energy of the plurality of constant speed sections according to the separated exerted forces in each of the plurality of constant speed sections and determining running energy of the plurality of speed change sections according to the separated exerted forces in each of the plurality of speed change sections; and
   acquiring the integrated running energy of the vehicle according to the running energy of the plurality of constant speed sections and the running energy of the plurality of speed change sections.

2. The method of claim 1, wherein the wind tunnel includes:
   a wheel rotating device configured to rotate the wheels of the vehicle; and
   a force measurement portion configured to measure driving force by which the wheel rotating device rotates the wheels to measure the exerted forces.

3. The method of claim 1, further including:
   before obtaining the plurality of constant speed sections and the plurality of speed change sections, performing a warm-up of the wheels where the wheels of the vehicle are rotated at a constant speed for a predetermined time period and the exerted forces for rotating the wheels are measured and collected.

4. The method of claim 3, wherein, in performing the warm-up of the wheels, a wind speed in the wind tunnel is set to zero and the wheels are rotated at the constant speed.

5. The method of claim 3, wherein, when change in the measured forces is kept within a predetermined range for a preset time period, the warm-up is terminated.

6. The method of claim 1, wherein each of the plurality of constant speed sections is arranged to be spaced apart by a preset speed interval, and a speed of the wheels maintained in each of the plurality of constant speed sections is measured for a preset time or longer than the preset time.

7. The method of claim 6, wherein the exerted forces in each of the plurality of constant speed sections are separated from the exerted forces in each of the plurality of speed change sections according to a preset force difference value.

8. The method of claim 7, wherein the plurality of constant speed sections includes:
a first constant speed section, wherein a first speed of the wheels is maintained and a first force is exerted to rotate the wheels;
a second constant speed section, wherein a second speed smaller than the first speed by a first speed interval is maintained and a second force smaller than the first force is exerted to rotate the wheels; and
a first speed change section, wherein the first speed is decelerated to the second speed,
wherein a magnitude of force measured in the first speed change section has a range between the first force and the second force and includes a magnitude which is smaller than a magnitude of the second force.

9. The method of claim 8, wherein measured force values falling in a range of the first force and a preset lower limit force are excluded from forces in the first speed change section, and the preset lower limit force is obtained by subtracting the preset force difference value from the first force.

10. The method of claim 9, wherein, when a speed at a time of measuring one of the measured force values excluded from the first speed change section is greater than the second speed, the measured force value is included in the forces in the first speed change section.

11. The method of claim 1, wherein in the determining of the running energy in the plurality of constant speed sections, the running energy in each constant speed section is obtained by multiplying an exerted force in each constant speed section, an average of wheel speeds, and a time.

12. The method of claim 1, wherein in the determining the running energy in the speed change section, the running energy is determined by multiplying an exerted force of each speed change section by an average of wheel speeds for each time and a time.

13. The method of claim 1, wherein the integrated running energy is determined by adding running energy used during deceleration or acceleration to the running energy in the constant speed section.

14. A non-transitory computer readable storage medium on which a program for performing the method of claim 1 is recorded.

15. A method of evaluating integrated running energy of a vehicle in a wind tunnel, wherein a test vehicle is positioned in the wind tunnel provided with a wheel rotating device and wheels of the test vehicle are rotated by the wheel rotating device, the method comprising:
performing a warm-up of the test vehicle;
evaluating deceleration of the test vehicle;
separating data obtained from the evaluating of the deceleration of the test vehicle, into a plurality of constant speed sections and a speed change section;
determining running energy of the plurality of constant speed sections and running energy of the speed change section; and
acquiring the integrated running energy of the vehicle according to the determined running energy of the plurality of constant speed sections and the determined running energy of the speed change section.

16. The method of claim 15, wherein, in performing the warm-up of the wheels, a wind speed in the wind tunnel is set to zero and the wheels are rotated at a constant rotation speed.

17. The method of claim 15, further including:
before or after the evaluating of the deceleration of the test vehicle, evaluating acceleration of the test vehicle.

18. The method of claim 15, wherein the evaluating of the deceleration of the test vehicle includes:
arranging the plurality of constant speed sections where a constant speed of the wheels is maintained for a predetermined time period for each preset speed section and the speed change section where a speed of the wheels is reduced between the plurality of constant speed sections; and
measuring forces exerted in each of the constant speed sections and the speed change section.

19. The method of claim 18, wherein, in the separating of the data obtained from the evaluating of the deceleration of the test vehicle, into the plurality of constant speed sections and the speed change section, the force exerted in each of the constant speed sections and the force exerted in the speed change section are classified according to a preset criterion.

20. A non-transitory computer readable storage medium on which a program for performing the method of claim 15 is recorded.

* * * * *